United States Patent
Horvath et al.

(10) Patent No.: US 7,986,711 B2
(45) Date of Patent: Jul. 26, 2011

(54) SYSTEM AND METHOD FOR DATA COMMUNICATION OVER POWER LINES

(75) Inventors: Stephan Horvath, Nidau (CH); Antony Jamin, Neuchâtel (CH)

(73) Assignee: ACN Advanced Communications Network SA, Neuchatel (CH)

( * ) Notice: Subject to any disclaimer, the term of this patent is extended or adjusted under 35 U.S.C. 154(b) by 602 days.

(21) Appl. No.: 11/246,560

(22) Filed: Oct. 11, 2005

(65) Prior Publication Data

US 2006/0146866 A1 Jul. 6, 2006

Related U.S. Application Data

(63) Continuation of application No. PCT/EP2004/050485, filed on Apr. 7, 2004.

(30) Foreign Application Priority Data

Apr. 8, 2003 (EP) .................................. 03100939

(51) Int. Cl.
H04J 1/02 (2006.01)
(52) U.S. Cl. ........................ 370/468; 370/497
(58) Field of Classification Search .................. 370/464
See application file for complete search history.

(56) References Cited

U.S. PATENT DOCUMENTS

| 1,816,905 | A | | 8/1931 | Horton | |
|---|---|---|---|---|---|
| 5,319,634 | A | | 6/1994 | Bartholomew | |
| 6,005,477 | A | | 12/1999 | Deck et al. | |
| 6,101,255 | A | * | 8/2000 | Harrison et al. | 380/52 |
| 6,370,153 | B1 | * | 4/2002 | Eng | 370/438 |
| 6,449,462 | B1 | * | 9/2002 | Gunnarsson et al. | 455/67.13 |
| 6,703,923 | B2 | | 3/2004 | Litwin, Jr. et al. | |
| 6,711,207 | B1 | * | 3/2004 | Amrany et al. | 375/222 |
| 6,771,775 | B1 | | 8/2004 | Widmer | |
| 2002/0027985 | A1 | * | 3/2002 | Rashid-Farrokhi | 379/417 |
| 2002/0041643 | A1 | * | 4/2002 | Tzannes et al. | 375/346 |
| 2002/0153998 | A1 | | 10/2002 | Litwin et al. | |
| 2003/0063680 | A1 | * | 4/2003 | Nedic et al. | 375/260 |
| 2003/0235236 | A1 | * | 12/2003 | Santhoff | 375/130 |
| 2004/0057529 | A1 | * | 3/2004 | Koga et al. | 375/260 |
| 2005/0043858 | A1 | * | 2/2005 | Gelman et al. | 700/286 |
| 2007/0076809 | A1 | * | 4/2007 | Koga et al. | 375/260 |

FOREIGN PATENT DOCUMENTS

| DE | 100 26 930 A1 | 5/2000 |
|---|---|---|
| JP | 60 137162 A | 7/1985 |
| JP | 60 198934 A | 10/1985 |
| JP | 10 271078 A | 10/1998 |
| JP | 11 252031 A | 9/1999 |
| JP | 2001 320306 A | 11/2001 |
| JP | 2002 523883 | 7/2002 |
| JP | 2002 314504 A | 10/2002 |
| JP | 2002 319919 A | 10/2002 |
| JP | 2002314466 A | 10/2002 |
| JP | 2002 374190 A | 12/2002 |
| WO | WO/99/27457 | 6/1999 |
| WO | WO-02087105 A1 | 10/2002 |

* cited by examiner

Primary Examiner — Jianye Wu
(74) Attorney, Agent, or Firm — Blank Rome LLP

(57) ABSTRACT

A system and method for broadband communications over power lines has a low-voltage transformer for the house connection unit and/or the electricity distribution inside the house. The system method allow for several parallel asynchronous data communications in different sub-channels with individual transmit power in each sub-channel. Sub-channel separation uses pass-band filters with high stop-band attenuation. High data rate in each sub-channel is achieved through the use of discrete wavelet multi-tone modulation. Coarse synchronization in each sub-channel and the optimization of the coefficients of the time-domain equalizer are carried out using a training sequence.

23 Claims, 8 Drawing Sheets

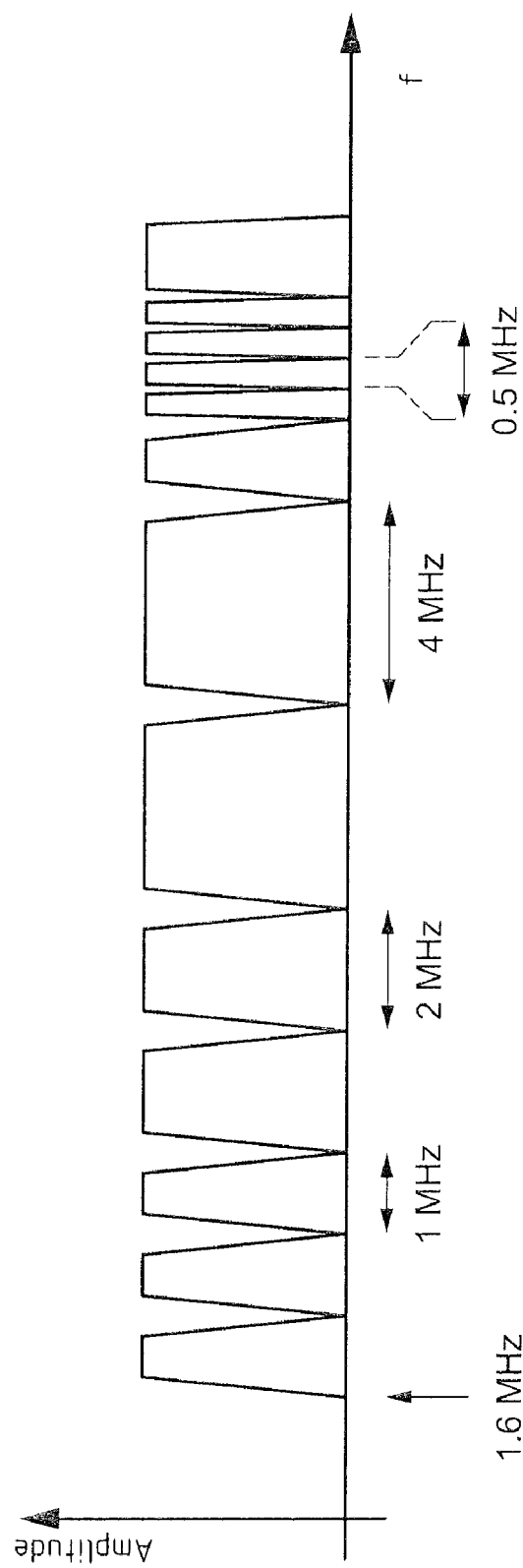

SYSTEM AND METHOD FOR DATA COMMUNICATION OVER POWER LINES

REFERENCE DATA

This application is a continuation of international PCT application PCT/EP2004/050485 (WO04091113) filed on Apr. 7, 2004 under priority of European application EP03100939.2 of Apr. 8, 2003, the contents of which are hereby incorporated by reference.

FIELD OF THE INVENTION

The invention relates to a system and a method for broadband data communications over a power line distribution network comprising the area between the low-voltage transformer station and the house connection unit and/or the electricity distribution within the house.

BACKGROUND ART AND ASSESSMENT THEREOF

Prior art systems for data communication over electric power distribution lines, for example between a low-voltage transformer station and a house connection unit and/or within a house, commonly use at least one master station and slave modems which have to register to the master station. The same network architecture is also used for broadband data communications over the electricity distribution inside the house.

Such systems are based either on time division multiple access (TDMA) and/or use orthogonal frequency division multiplexing (OFDM) techniques. Although OFDM techniques allow for higher data rates than time division multiple access techniques, they have a major drawback in that they have poor stop-band attenuation.

Disadvantages of the master-slave approach are that the transmit level of the master station must be high enough to allow to reach the most distant slave modem and that the communication bandwidth must be shared between several slave modems.

Main disadvantages of the prior art systems for data communication over electric power distribution lines are:
  a high transmit level needed to reach the most distant slave modem, resulting in corresponding electromagnetic radiation emissions,
  complex random access schemes required to control the permission to transmit of the slave modems,
  the master station represents a single point of failure, and
  the need for time synchronization between different master stations to avoid interferences between the ongoing simultaneous power line communications, if several power line master-slave systems are used at the same time.

These drawbacks are main barriers to the broad deployment of power line communication.

SUMMARY OF THE INVENTION

An aim of the present invention is to provide a system and a method for data communication over power lines allowing to achieve high data communication rates.

Another aim of the present invention is to provide a system and a method for data communication over power lines allowing that several power line modem to power line modem data transmissions happen simultaneously and asynchronously over the power distribution network.

Another aim of the present invention is to provide a system and a method for data communication over power lines allowing the use of different transmit power levels of the power line modems.

Still another aim of the present invention is to provide a system and a method for data communication over power lines not requiring any synchronization between different power line communications happening in parallel.

These aims are achieved with a system and a method having the characteristics of the respective independent claim, variant embodiments being given by the dependent claims.

These aims are achieved in particular with a method for data communication from a plurality of senders to a plurality of receivers being connected over a single electric power network having a determined data transmission channel bandwidth, comprising the step of simultaneously asynchronously transmitting data over a plurality of peer-to-peer transmission channels established between the senders and the receivers, as well as with a system for data communication comprising a plurality of communication devices for transmitting and/or receiving data over an electric power network having a determined data transmission channel bandwidth, the communication devices each comprising a transceiver system designed for asynchronously transmitting data over a plurality of peer-to-peer transmission channels established between them.

According to a preferred embodiment of the inventive data communication method, the power line channel bandwidth is divided into n sub-channels of the same or of a different bandwidth, n being an integer greater than two. According to a preferred embodiment of the present invention, the n sub-channels are for example separated by using digital filters having high stop-band attenuation.

The inventive power line modem preferably includes means for detecting communication activity, for example in a pre-selected subset of the n sub-channels, in order to identify one free sub-channel for transmitting the data to be sent over the physical channel. The data is modulated using for example discrete cosine modulated filter banks or discrete wavelet modulation. The receiver performs symbol synchronization and time-domain equalization of the sub-channel impulse response, and carries out the inverse function to the one employed by the sender, in order to recover the data using for example discrete cosine modulated filter banks or discrete wavelet filter bank.

The present invention thus allows a plurality of power line modem to power line modem data communications to happen in parallel and the transmit power can be differently determined for each sub-channel communication, leading to optimally reduced interferences between the sub-channels. According to the invention, there is no need for synchronization between parallel data communications as they occur on separated sub-channels. There is no more single point of failure either, since there is no need for a master station and/or for a complex access mechanism.

DESCRIPTION OF THE DRAWINGS

A better understanding of the present invention can be obtained when the following detailed description of embodiments of the invention is considered in conjunction with the following drawings, in which

FIG. 2 illustrates a partitioning of the power line channel bandwidth into sub-channels according to a preferred embodiment of the present invention.

DESCRIPTION OF THE INVENTION

Figure 1:
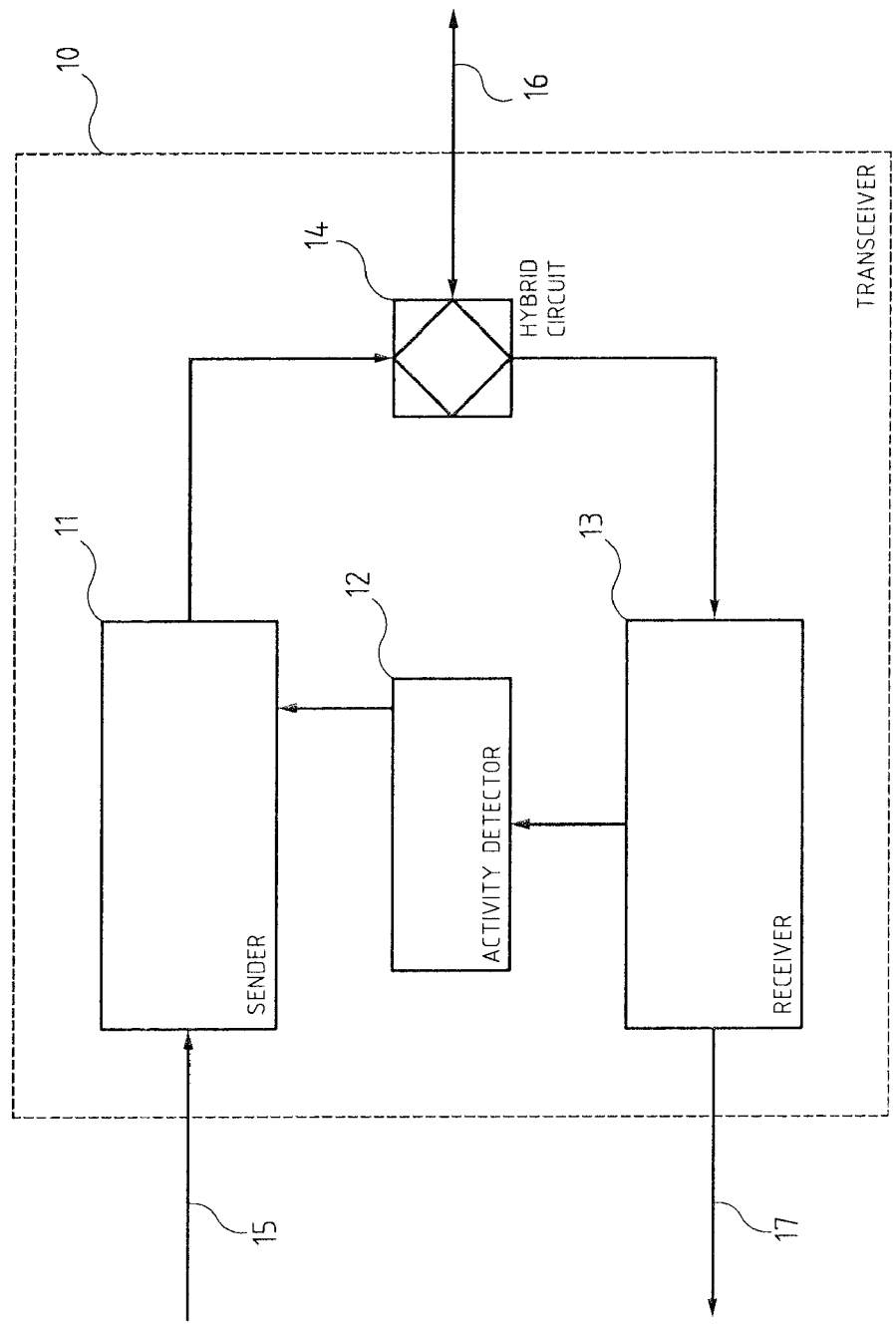
FIG. 1 is a conceptual block diagram of a transceiver system in accordance with a preferred embodiment of the present invention.

FIG. 1 is a block diagram of a transceiver system 10 implemented in a power line modem in accordance with a preferred embodiment of the present invention. The transceiver system preferably includes a sender 11 based for example on a discrete cosine modulated filter bank or on a wavelet packet modulated filter bank and a receiver 13 also based for instance on a discrete cosine modulated filter bank or on a wavelet packet modulated filter bank. A data communication activity detector 12 is connected to the receiver 13. The sender 11 and the receiver 13 are connected to the hybrid circuit 14 over which the transceiver system 10 is connected to the electric power distribution network 16.

According to a preferred embodiment of the invention, the transceiver system implemented in the inventive power line modem comprises a sender 11 and a receiver 13. It is therefore able to both transmit and receive data, possibly at the same time and on different sub-channels. The one skilled in the art will however recognize that it is possible, within the frame of the invention, to build communication devices such as modems able only either to send or to receive data. The transceiver system implemented in such devices then comprise respectively a sender 11 and no receiver 13 or a receiver 13 and no sender 11.

FIG. 2 shows how the bandwidth of the power line communication network is divided into n sub-channels of different bandwidth in accordance with an embodiment of the present invention. The bandwidth of the sub-channels are for example 4 MHz, 2 MHz, 1 MHz or 0.5 MHz.

According to a preferred embodiment of the invention, the receiver 13 of the power line modem who wants to transmit selects by the activity detector 12 the different pre-selected sub-channels one after the other and monitors if data communication activity is present on the sub-channel by measuring the signal energy in that sub-channel. The activity detector 12 identifies in this manner a sub-channel that is free to be employed for transmission and communicates this information to the sender 11. If more than one sub-channel is available, the transceiver system preferably selects the best sub-channel basing on one or more predefined criteria such as for example the sub-channels' bandwidth, frequency range, attenuation characteristics, noise, etc.

Figure 3A:
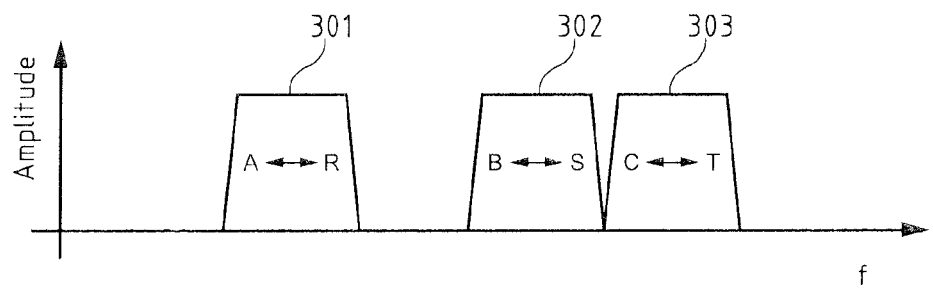
FIG. 3a illustrates three simultaneous asynchronous data transmissions happening in parallel, using different sub-channels of the power line channel bandwidth in accordance with a preferred embodiment of the present invention.
Figure 3B:
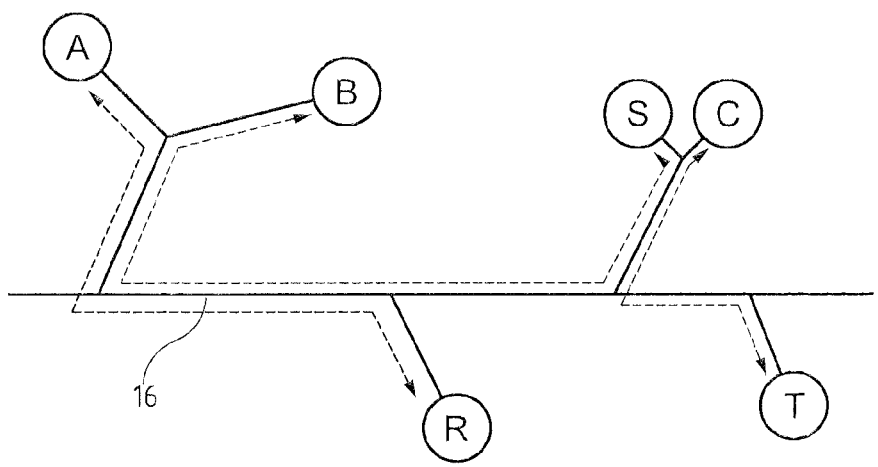
FIG. 3b diagrammatically represents the three data transmissions of FIG. 3a happening in parallel over the electric power distribution network.

The selected free power line sub-channel is then used for transmitting the data over the electric power distribution network, such as for example sub-channel 302 is used for data transmission between power line modem B and power line modem 5, as illustrated in FIG. 3a. A peer-to-peer data transmission channel is thus established between these two modems. FIG. 3a and FIG. 3b further illustrates how three communications happen simultaneously through three parallel peer-to-peer transmission channels, each using a different sub-channel of the power line channel bandwidth. These parallel communications are totally independent from each other and can thus be performed asynchronously. The transceiver system of every power line modem A, B, C, R, S and T is preferably implemented according to FIG. 1.

The inventive data communication method thus allows the generation of a meshed data communication network over an electric power distribution network, where each communication device can establish a peer-to-peer communication with any other device of the network. The transmission power for each peer-to-peer communication is preferably adapted to the characteristics of the transmission line between the two devices. In order to avoid disturbances of the network's environment, the transmission power must however be kept within certain limits. Thanks to the meshed architecture of the inventive network, one or more communication devices can for example be used as repeaters or relays between two communication devices situated far apart from each other. One or more communication devices of the inventive network can also function as relays or gateways to other networks such as the internet, for example.

Figure 4:
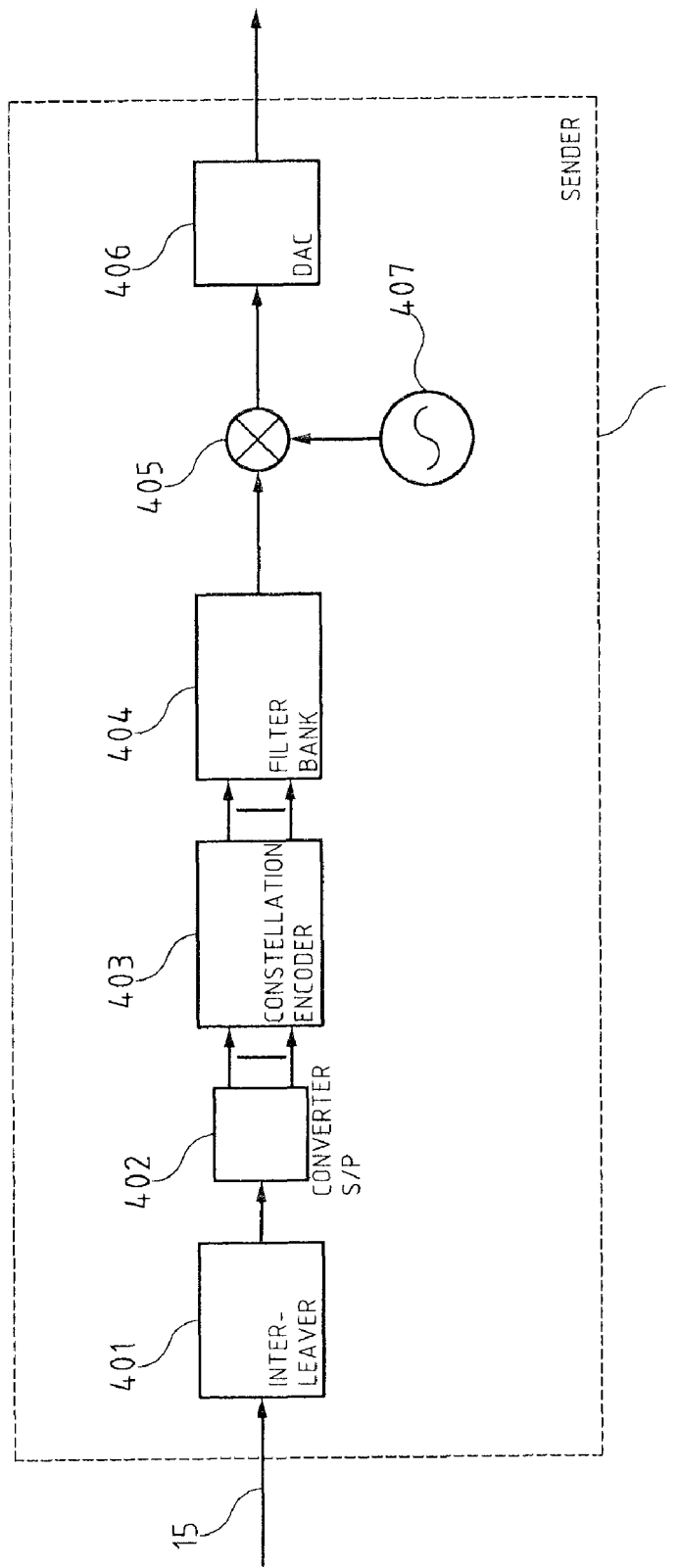
FIG. 4 is a block diagram of the sender of FIG. 1.

As shown in FIG. 4 illustrating the block diagram of the sender 11 in more details, the data 15 to be transmitted is first interleaved in an interleaver 401 and converted from serial to parallel in a converter 402 and then encoded using a constellation encoder 403.

The parallel output of the constellation encoder 403 is lead to a discrete cosine modulated filter bank or to a wavelet packet modulated filter bank 404. The bandwidth of the filter bank 404 is for example of 1 MHz and the cosine modulated filter bank or the wavelet packet modulated filter bank preferably has for instance 24 or 64 carriers, each with high stop-band attenuation.

The serial output of the filter bank 404 is digitally up-shifted in frequency to the selected free sub-channel's frequency by a modulator 405 including a frequency generator 407. The output of modulator 405 is given to a digital-to-analog converter 406 to be transmitted over the selected sub-channel of the electric power distribution network.

Figure 5:
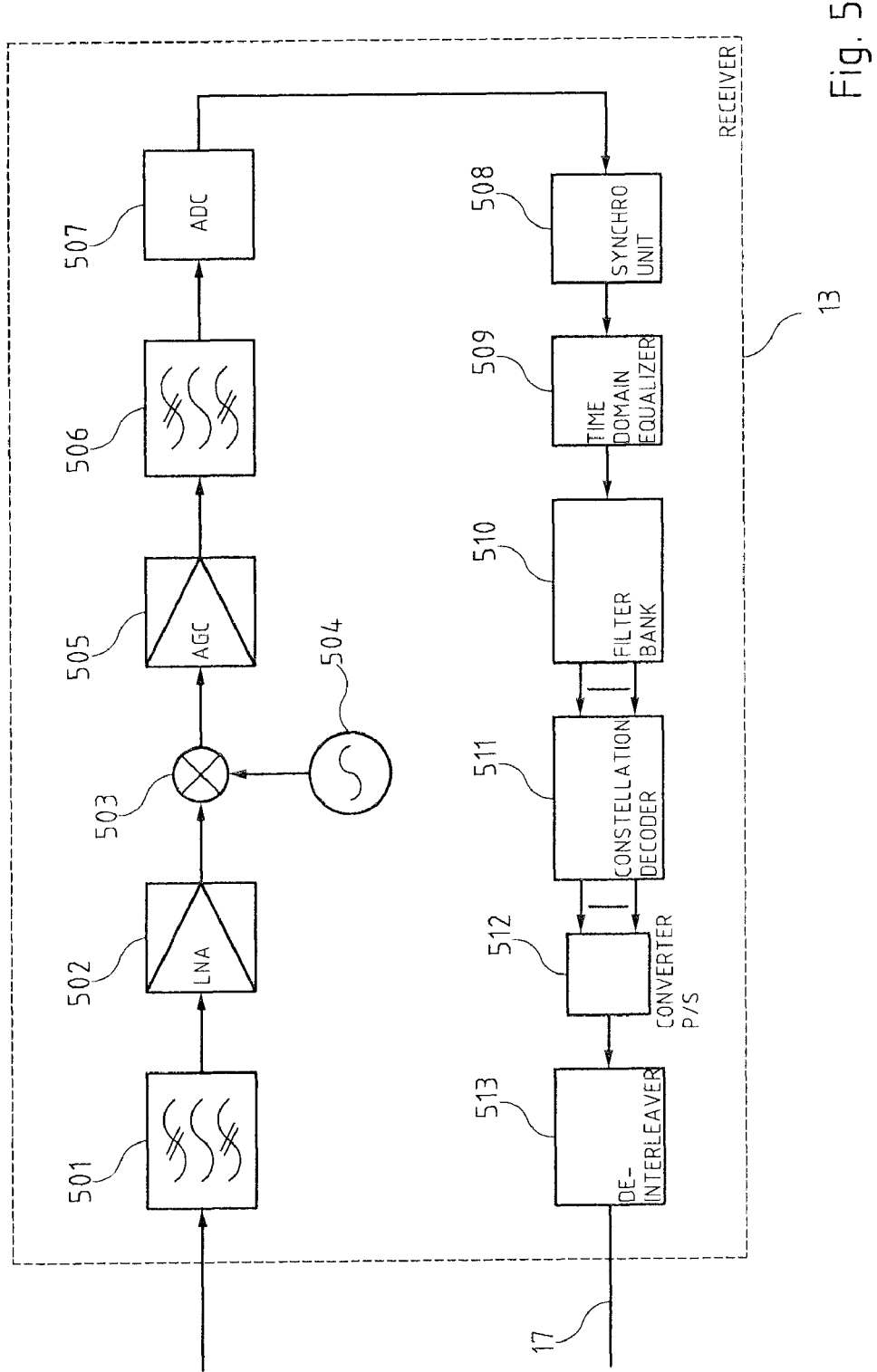
FIG. 5 is a block diagram of the receiver of FIG. 1.

As shown in FIG. 5, the received signal is preferably first band-pass filtered using a band-pass filter 501, then amplified using a low noise amplifier 502 and up-shifted using a modulator 503 to a chosen Intermediate Frequency (IF). The signal is then amplified again using an automatic gain control 505, band-pass filtered by the band-pass filter 506, before being fed to an analog-to-digital converter 507 to be digitalized and possibly over-sampled.

According to a preferred embodiment of the invention, coarse synchronization with the emitting modem's sender is achieved in a synchronization unit 508 employing matched filtering techniques using training symbols known to the receiver 13. The training symbols are preferably sent by the sender at least once for each newly established peer-to-peer data transmission. The beginning of the sent training symbol is detected by the synchronization unit 508 which will then initiate the synchronization procedure. These training symbols are also used to determine the coefficients of the time-domain recursive equalizer 509. Fine synchronization together with a compensation of the frequency offset between sender sampling clock and sampling clock of the receiver is carried out based on pilot symbols.

To recover the data sent, the output of the time-domain equalizer 509 is fed to a filter bank 510 consisting for example of a discrete cosine modulated filter bank or of a wavelet packet modulated filter bank. The parallel output of the filter bank 510 is fed to a constellation decoder 511. The parallel output of the constellation decoder 511 is in turn fed to a parallel to serial converter 512 the output of which is fed to a de-interleaving unit 513. The output of the de-interleaving unit 513 is the estimate 17 of the sent data.

Figure 6A:
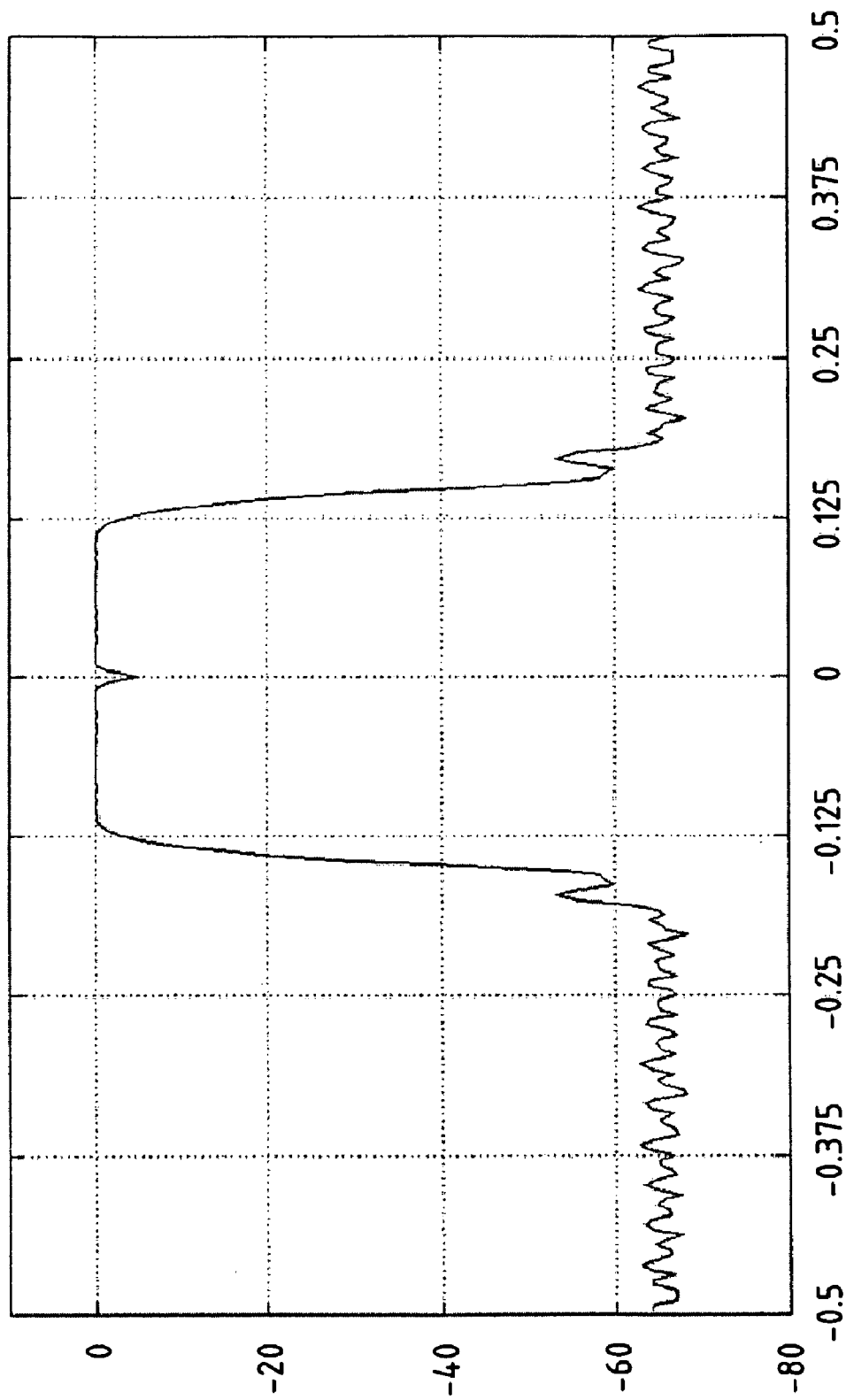
FIG. 6a shows the frequency response of a discrete cosine modulated bank of a bandwidth of 1 MHz in accordance with an embodiment of the present invention.

FIG. 6a shows as an example the frequency response of a discrete cosine modulated filter bank 510 of a bandwidth of 1 MHz. The horizontal axis shows the normalized frequency [×2π rad/s] while the vertical axis shows the amplitude in dB. One can see that the energy of the modulated data signal is confined in a very narrow frequency range and that it is very strongly attenuated outside that range. Thanks to that particular feature, such signals using different frequency ranges can be transmitted on a single transmission line without generating significant cross-talk between each others. Different data transmissions can thus be asynchronously initiated in parallel on neighboring sub-channels without risks of mutual perturbations.

Figure 6B:
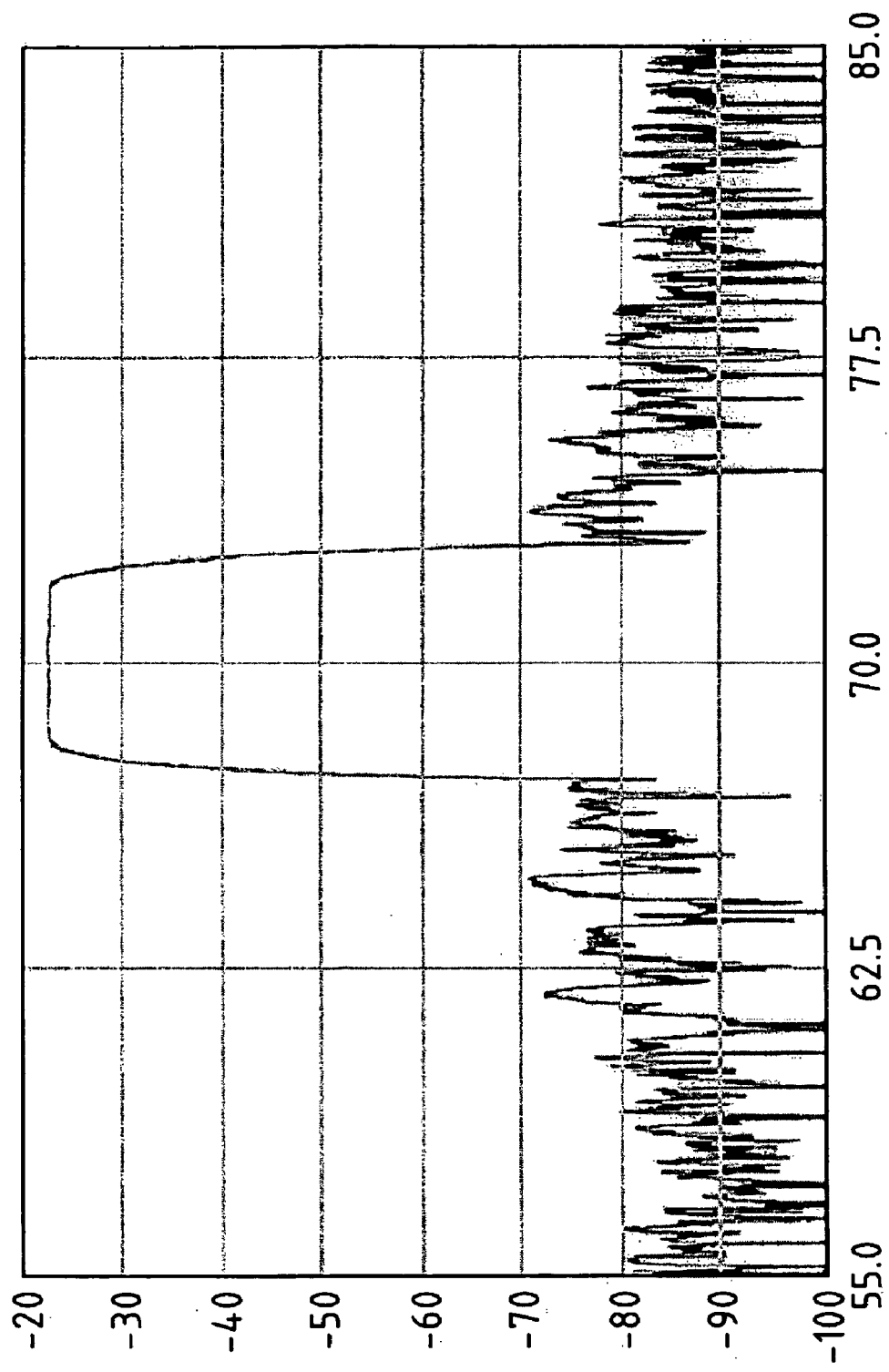
FIG. 6b shows the frequency response of an analog band-pass filter of 4 MHz employed in the receiver in accordance with another embodiment of the present invention.

On the receiver's side, in order to retrieve the sent information, the received signal is filtered with a band-pass filter having a frequency response similar to that illustrated in FIG. 6b. In FIG. 6b, the horizontal axis shows the frequency in MHz while the vertical axis shows the amplitude in dB. By centering the filter's frequency response on the desired sub-channel, only the signal sent on that sub-channel is received.

Figure 7:
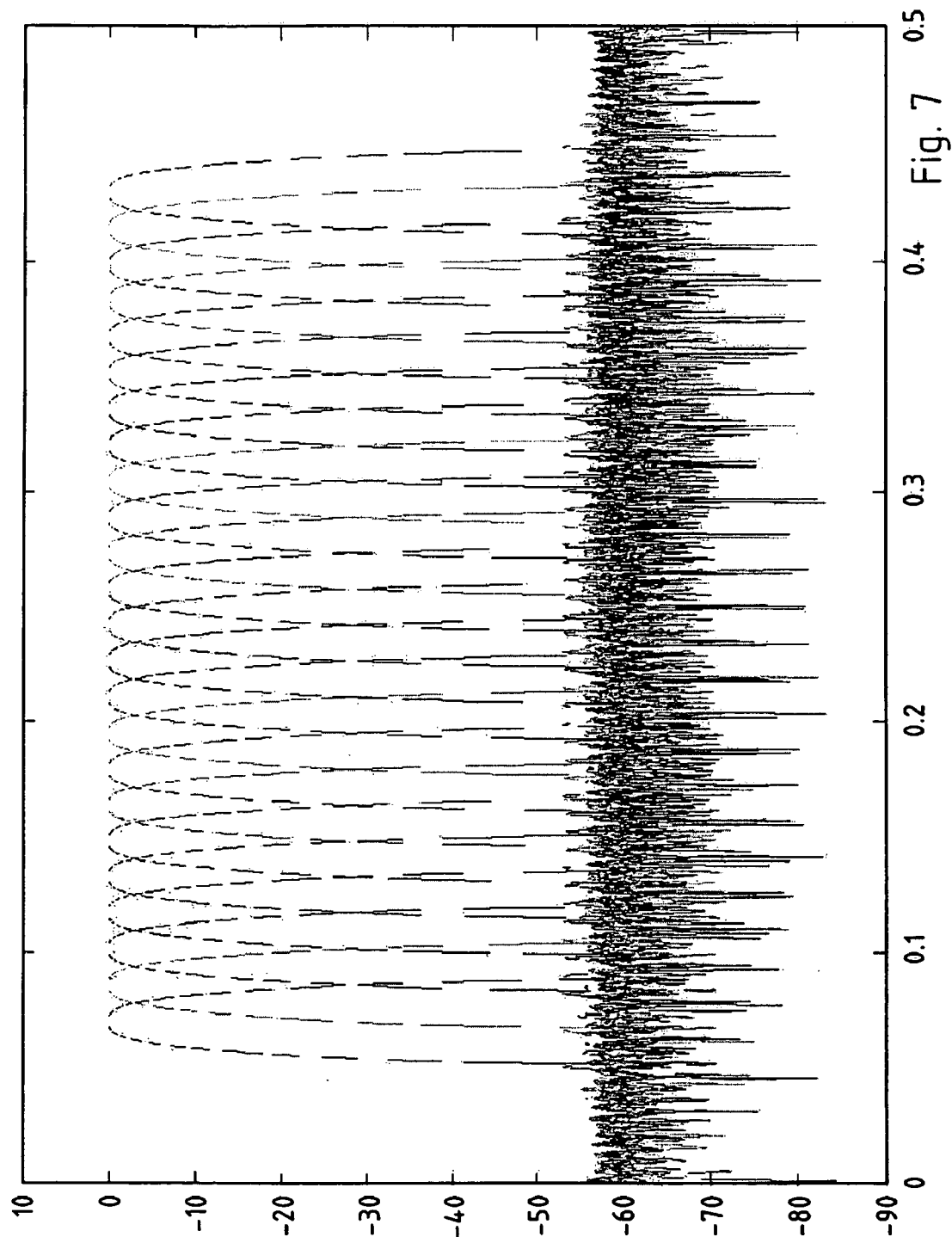
FIG. 7 shows 24 sub-carriers that are employed within the normalized frequency range of 0.70 to 0.125 of FIG. 6a according to a preferred embodiment of the present invention.

According to a preferred embodiment of the invention, the transceiver system 10 comprises a sender 11 modulating the data to be transmitted with a discrete cosine modulated filter bank or with a wavelet packet modulated filter bank 404. The transceiver system 10 is thus a multi-carrier transceiver system and the transmitted data is modulated over a plurality, for example 24, sub-carriers within the frequency bandwidth available in the selected sub-channel (FIG. 7). In FIG. 7, the horizontal axis shows the normalized frequency while the vertical axis shows the amplitude in dB. Preferably, the transceiver system 10 is configured such that the level of the transmitting power and the number of encoded data bits, or data rate, can be chosen different for each sub-carrier, depending on predetermined or measured transmission characteristics in the particular sub-carrier frequency band. The transmission characteristics can for example depend on the measured signal-to-noise ratio, the available bandwidth, the attenuation, etc. The transceiver system 10 thus preferably includes a not represented device and/or a memory storage area for determining and/or storing these sub-carrier specific characteristics.

The invention claimed is:

1. A method for data communication, comprising the step of:
from a plurality of senders to a plurality of receivers being connected over a single electric power network having a determined data transmission channel bandwidth in a frequency band of 1.6-40 MHz, simultaneously asynchronously transmitting data over any of a plurality of parallel peer-to-peer transmission channels established on said single electric power network between said plurality of senders and said plurality of receivers;
said channel bandwidth being dynamically divided into a plurality of non-overlapping sub-channels having different frequency bandwidths and using band-pass filters, each of said parallel peer-to-peer transmission channels using a different one of said sub-channels;
wherein each of the plurality of senders detects current data transmission activity on a plurality of said sub-channels and selects a sub-channel free of any current data transmission activity for transmitting data.

2. The method of claim 1, further comprising modulating said data with a Discrete Cosine Modulation filter bank.

3. The method of claim 1, further comprising modulating said data with a Wavelet Packet filter bank.

4. The method of claim 1, further comprising synchronizing each of said receivers with a corresponding sender.

5. The method of claim 4, said synchronizing being performed with a training sequence known from said receivers and transmitted by said corresponding senders.

6. The method of claim 1, data transmission over each of said peer-to-peer transmission channels being performed at a different transmission power.

7. The method of claim 6, said transmission power being adapted to the signal attenuation along the corresponding peer-to-peer transmission channel.

8. The method of claim 1, further comprising encrypting said data using a public-private key encryption method.

9. A system for data communication comprising:
a plurality of bi-directional communication devices for transmitting and/or receiving data over an electric power network having a determined data transmission channel bandwidth in a frequency band of 1.6-40 MHz;
said bi-directional communication devices each comprising a transceiver system designed for asynchronously transmitting data over any of a plurality of parallel peer-to-peer transmission channels established on said electric power network between said plurality of bi-directional communication devices;
wherein the system is arranged to dynamically divide said channel bandwidth into a plurality of non-overlapping sub-channels having different frequency bandwidths and using band-pass filters, each of said peer-to-peer transmission channels being established using one of said plurality of non-overlapping sub-channels, wherein each of the plurality of bi-directional communication devices detects current data transmission activity on a plurality of said sub-channels and selects a sub-channel free of any current data transmission activity for transmitting data.

10. The system of claim 9, each of said plurality of bi-directional communication devices comprising a sender and/or a receiver.

11. The system of claim 10, said sender and/or receiver comprising a filter bank for modulating and/or demodulating the data to be transmitted and/or received over said sub-channel using a plurality of sub-carriers.

12. The system of claim 11, said transceiver system being configured so as to transmit at different data rates and/or transmit power level for each one of said plurality of sub-carriers, depending on the transmission characteristics in the corresponding sub-carrier frequency bandwidth.

13. The system of claim 11, said filter bank being a Discrete Cosine Modulation filter bank.

14. The system of claim 11, said filter bank being a Wavelet Packet filter bank.

15. The system of claim 10, said receiver comprising a synchronization device for synchronizing said receiver with a corresponding sender.

16. The system of claim 15, said receiver being synchronized with the help of a training sequence known from the receiver and transmitted by the corresponding sender.

17. A method for data communication, comprising:
from a plurality of senders to a plurality of receivers being connected over a single electric power network having a determined data transmission channel bandwidth in a frequency band of 1.6-40 MHz, simultaneously asynchronously transmitting data over a plurality of parallel peer-to-peer transmission channels established on said single electric power network between said plurality of senders and said plurality of receivers;
said channel bandwidth being dynamically divided into a plurality of non-overlapping sub-channels, each of said parallel peer-to-peer transmission channels using a different one of said sub-channels having different frequency bandwidths and using band-pass filters and comprising a step of discrete wavelet multi-tone modulating data, within said parallel peer-to-peer transmission channels, over a plurality of sub-carriers within the frequency bandwidth available in the sub-channel used by said parallel peer-to-peer transmission channel;
wherein each of the plurality of senders detects current data transmission activity on a plurality of said sub-channels and selects a sub-channel free of any current data transmission activity for transmitting data.

18. A system for data communication comprising:
a plurality of bi-directional communication devices for transmitting and/or receiving data over an electric power network having a determined data transmission channel bandwidth in a frequency band of 1.6-40 MHz;
said bi-directional communication devices each comprising a transceiver system designed for asynchronously transmitting data over a plurality of parallel peer-to-peer transmission channels established on said electric power network between said plurality of bi-directional communication devices, wherein each of said peer-to-peer transmission channels being established using a different one of non-overlapping sub-channels having different frequency bandwidths and using band-pass filters; and
wherein each of said bi-directional communication devices detects current data transmission activity on a plurality of said sub-channels and selects a sub-channel free of any current data transmission activity for transmitting data, and comprises a filter bank for discrete wavelet multi-tone modulating and/or demodulating the data to be transmitted and/or received over said sub-channel using a plurality of sub-carriers, said transceiver system being configured so as to transmit at different data rates and/or transmit power level for each one of said plurality of sub-carriers, depending on the transmission characteristics in the corresponding sub-carrier frequency bandwidth.

19. The method of claim 1, wherein said detecting comprises measuring signal energy for a selected one of the plurality of sub-channels.

20. The method of claim 1, comprising the steps performed by the sender of detecting current data transmission activity on a plurality of said sub-channels, determining which of the plurality of sub-channels are free of any data transmission activity, and selecting one of the plurality of sub-channels determined to be free of any data transmission activity.

21. The method of claim 20, wherein said selecting comprises selecting the best sub-channel of the plurality of sub-channels determined to be free of any data transmission activity based on at least one of bandwidth, attenuation characteristics and noise.

22. The method of claim 1, wherein each sub-channel has individual transmit power.

23. A power line modem comprising:
a power line network that has a bandwidth in a frequency band of 1.6-40 MHz connecting to the power line modem;
a sender;
a receiver; and
an activity detector circuit, wherein the activity detector circuit is arranged to detect presence of a data communication activity in a plurality of non-overlapping sub-channels channels having different frequency bandwidths and using band-pass filters obtained by dividing said bandwidth of the power line network;
wherein the sender detects current data transmission activity on one of said plurality of said sub-channels and to select a free sub-channel that is free from data communication activity, to be employed for transmission, wherein the sender comprises a discrete cosine modulated filter bank or a wavelet packet modulated filter bank arranged to modulate the data to be transmitted over a plurality of sub-carriers, and a modulator arranged to digitally upshift the serial output of said discrete cosine modulated filter bank or a wavelet packet modulated filter bank in said selected free sub-channel.

* * * * *